United States Patent
Zhou et al.

(10) Patent No.: US 7,549,151 B2
(45) Date of Patent: Jun. 16, 2009

(54) FAST AND MEMORY PROTECTED ASYNCHRONOUS MESSAGE SCHEME IN A MULTI-PROCESS AND MULTI-THREAD ENVIRONMENT

(75) Inventors: Hao Zhou, Kanata (CA); Sebastien Marineau-Mes, Kanata (CA); Peter van der Veen, Ottawa (CA); Pradeep Kathail, Los Altos, CA (US); Steve Belair, Santa Cruz, CA (US)

(73) Assignee: QNX Software Systems, Ottawa, Ontario (CA)

( * ) Notice: Subject to any disclaimer, the term of this patent is extended or adjusted under 35 U.S.C. 154(b) by 840 days.

(21) Appl. No.: 11/145,105

(22) Filed: Jun. 3, 2005

(65) Prior Publication Data

US 2006/0182137 A1 Aug. 17, 2006

Related U.S. Application Data

(60) Provisional application No. 60/652,929, filed on Feb. 14, 2005.

(51) Int. Cl.
*G06F 13/00* (2006.01)

(52) U.S. Cl. .................. 719/313; 719/314; 719/318; 719/330

(58) Field of Classification Search .............. 719/313, 719/314, 318, 330
See application file for complete search history.

(56) References Cited

U.S. PATENT DOCUMENTS

| | | | |
|---|---|---|---|
| 4,887,204 A | 12/1989 | Johnson et al. | |
| 4,897,781 A | 1/1990 | Chang et al. | |
| 5,253,342 A | 10/1993 | Blount et al. | |
| 5,442,785 A | 8/1995 | Roffe et al. | |
| 5,452,447 A | 9/1995 | Nelson et al. | |
| 5,548,760 A | 8/1996 | Healey | |
| 5,566,302 A | 10/1996 | Khalidi et al. | |
| 5,566,337 A | 10/1996 | Szymanski et al. | |
| 5,574,903 A | 11/1996 | Szymanski et al. | |
| 5,577,251 A | 11/1996 | Hamilton et al. | |
| 5,581,705 A | 12/1996 | Passint et al. | |
| 5,590,334 A | 12/1996 | Saulpaugh et al. | |
| 5,734,903 A | 3/1998 | Saulpaugh et al. | |

(Continued)

FOREIGN PATENT DOCUMENTS

EP 1 517 575 A2 3/2005

(Continued)

OTHER PUBLICATIONS

McKenny, M. et al., "Transporting multiple classes of traffic over a generic routing device—An investigation into the performance of the RapidIO™ interconnect architecture," 2003 IEEE, pp. 39-44.

(Continued)

*Primary Examiner*—Andy Ho
(74) *Attorney, Agent, or Firm*—Brinks Hofer Gilson & Lione

(57) ABSTRACT

An asynchronous message passing mechanism that allows for multiple messages to be batched for delivery between processes, while allowing for full memory protection during data transfers and a lockless mechanism for speeding up queue operation and queuing and delivering messages simultaneously.

20 Claims, 6 Drawing Sheets

U.S. PATENT DOCUMENTS

| | | | |
|---|---|---|---|
| 5,787,251 | A | 7/1998 | Hamilton et al. |
| 5,790,804 | A | 8/1998 | Osborne |
| 5,802,288 | A | 9/1998 | Ekanadham et al. |
| 5,991,820 | A | 11/1999 | Dean |
| 6,047,323 | A | 4/2000 | Krause |
| 6,049,838 | A | 4/2000 | Miller et al. |
| 6,157,961 | A | 12/2000 | Kessler et al. |
| 6,321,279 | B1 | 11/2001 | Bonola |
| 6,356,904 | B1 | 3/2002 | Moriyama |
| 6,385,659 | B1 | 5/2002 | Tuel, Jr. |
| 6,393,497 | B1 | 5/2002 | Arnold et al. |
| 6,412,018 | B1 | 6/2002 | Tuel, Jr. |
| 6,415,332 | B1 | 7/2002 | Tuel, Jr. |
| 6,434,459 | B2 | 8/2002 | Wong et al. |
| 6,446,070 | B1 | 9/2002 | Arnold et al. |
| 6,466,947 | B2 | 10/2002 | Arnold et al. |
| 6,466,996 | B1 | 10/2002 | Bonola |
| 6,487,607 | B1 | 11/2002 | Wollrath et al. |
| 6,513,049 | B1 | 1/2003 | Moriyama |
| 6,519,594 | B1 | 2/2003 | Li |
| 6,643,650 | B1 | 11/2003 | Slaughter et al. |
| 6,647,423 | B2 | 11/2003 | Regnier et al. |
| 6,658,485 | B1 * | 12/2003 | Baber et al. ............... 719/314 |
| 6,697,876 | B1 | 2/2004 | Van der Veen et al. |
| 6,728,722 | B1 | 4/2004 | Shaylor |
| 6,748,452 | B1 | 6/2004 | Elphinstone et al. |
| 6,757,903 | B1 | 6/2004 | Havemose |
| 6,757,904 | B1 | 6/2004 | Woodruff et al. |
| 6,785,892 | B1 | 8/2004 | Miller et al. |
| 6,789,077 | B1 | 9/2004 | Slaughter et al. |
| 6,789,126 | B1 | 9/2004 | Saulpaugh et al. |
| 6,792,466 | B1 | 9/2004 | Saulpaugh et al. |
| 6,817,018 | B1 * | 11/2004 | Clarke et al. ............... 719/313 |
| 6,850,979 | B1 | 2/2005 | Saulpaugh et al. |
| 6,959,264 | B2 | 10/2005 | Mandal |
| 6,981,244 | B1 | 12/2005 | Kathail et al. |
| 6,985,951 | B2 | 1/2006 | Kubala et al. |
| 6,993,746 | B2 | 1/2006 | Hue |
| 7,051,335 | B2 * | 5/2006 | Gehring et al. ............. 719/315 |
| 7,058,955 | B2 * | 6/2006 | Porkka ....................... 719/314 |
| 2002/0069302 | A1 * | 6/2002 | Porkka ....................... 709/313 |
| 2002/0129172 | A1 | 9/2002 | Baskey et al. |
| 2002/0147785 | A1 | 10/2002 | Venkatsubramanian et al. |
| 2002/0161848 | A1 | 10/2002 | Willman et al. |
| 2003/0033427 | A1 | 2/2003 | Brahmaroutu |
| 2003/0041096 | A1 | 2/2003 | Johnson |
| 2003/0115366 | A1 * | 6/2003 | Robinson ................... 709/248 |
| 2004/0078543 | A1 | 4/2004 | Koning et al. |
| 2004/0083317 | A1 | 4/2004 | Dickson et al. |
| 2004/0205770 | A1 * | 10/2004 | Zhang et al. ............... 719/313 |
| 2004/0216135 | A1 | 10/2004 | Heimbeck |
| 2005/0044151 | A1 | 2/2005 | Jiang et al. |
| 2005/0125464 | A1 * | 6/2005 | Kline ......................... 707/204 |
| 2005/0138632 | A1 * | 6/2005 | Groetzner et al. .......... 719/313 |
| 2005/0149601 | A1 | 7/2005 | Cox et al. |
| 2005/0268300 | A1 | 12/2005 | Lamb et al. |
| 2006/0047875 | A1 | 3/2006 | Aguilar, Jr. et al. |
| 2006/0090103 | A1 * | 4/2006 | Armstrong et al. ......... 714/100 |
| 2006/0095724 | A1 | 5/2006 | Singh |
| 2006/0106995 | A1 | 5/2006 | Shen |
| 2006/0150200 | A1 | 7/2006 | Cohen et al. |
| 2006/0277284 | A1 | 12/2006 | Boyd |
| 2006/0277285 | A1 | 12/2006 | Boyd |
| 2007/0097881 | A1 | 5/2007 | Jenkins et al. |

FOREIGN PATENT DOCUMENTS

| | | | |
|---|---|---|---|
| WO | WO 00-24205 | A1 | 4/2000 |

OTHER PUBLICATIONS

Strass, H., "Abschied vom Bus: RapidIO," *Elektronik*, vol. 49, No. 24, Nov. 28, 2000, pp. 52-55.

* cited by examiner

FAST AND MEMORY PROTECTED ASYNCHRONOUS MESSAGE SCHEME IN A MULTI-PROCESS AND MULTI-THREAD ENVIRONMENT

PRIORITY CLAIM

This application claims the benefit of priority from U.S. Provisional Application No. 60/652,929, filed Feb. 14, 2005, which is incorporated herein by reference.

BACKGROUND OF THE INVENTION

1. Technical Field

The present application relates to computer operating systems, and more specifically, to inter-process communications in multi-process and/or multi-threaded 2. Related Art Inter-process communication (IPC), which generally refers the exchange of data between programs either within the same computer or over a network, has become vital in today's real time distributed operations systems. IPC may be implemented using various data transfer methodologies, and is typically provided by the kernel module of the operating system. The kernel, which provides various user level computer programs with secure access to the computer's hardware, may provide IPC to allow coordination of processing among various processes and threads running on the system. As known in the art, a thread is a conveniently sized collection of programming steps that are scheduled and executed as a group, while a process may act as a "container" of threads. Processes may define the address space within which threads will execute. A process may contain at least one thread.

Message passing may be implemented to provide IPC throughout the entire system. In general, a message may be a packet of bytes passed from one process to another with no special meaning attached to the content of the message. The data in a message may have meaning for the sender of the message and for its receiver, but for no one else. Message passing not only allows processes to pass data to each other, but also provides a means of synchronizing the execution of several processes. As they send, receive, and reply to messages, processes undergo various "changes of state" that affect when and for how long, they may run. Knowing their states and priorities, the operating system may schedule processes as efficiently as possible to optimize the available processor resources.

To manage these changes of state and avoid deadlock situations that may occur due to communications taking place in the wrong state, operating systems employ synchronous message passing systems. Synchronous message passing systems are those that require coordination among the sending, receiving, and replying to of messages between the threads or processes. While these synchronous systems are ideal for enforcing in-order processing of messages, they are prone to out of state and deadlock conditions, and do not provide for high level of data throughput as messages must be sent individually. Moreover, these problems become exacerbated as the number of intercommunication processes or threads increase, limiting their effectiveness in today's data intensive processing.

To accommodate these processing needs, asynchronous systems have been developed to transfer messages independently of the coordination between communicating threads or processes. While these systems do provide great benefits, they still suffer from various performance issues. For example, some asynchronous message passing systems do not provide for full memory protected data transfers. As a result, programs may corrupt the address space of one another. Additionally, asynchronous message passing systems typically allow messages to be only buffered or sent at any point in time, blocking the thread from queuing new messages if previously queued messages are being transferred.

Accordingly, there is a need for an asynchronous message passing system that may provide mechanisms for sending multiple messages by message buffering, sending and/or receiving a batch of messages based on a triggering method. The system may also provide for fill memory protection when passing messages between the threads or processes, and may also provide a lockless queuing mechanism that allows for sending and buffering messages simultaneously.

SUMMARY

Systems and methods of managing asynchronous interprocess communications in distributed operating systems to accelerate existing mechanism in today's operating systems are described. Existing asynchronous messaging schemes make one kernel call to send or receive each message and employ locking schemes that slow performance by introducing extra locking overhead and not allowing simultaneous messages queuing and delivery in a multiprocessor system. In addition, some do not provide full memory protection for these communications. The systems and methods described here provide an asynchronous message passing mechanism that allows for multiple messages to be batched for delivery between processes while allowing for full memory protection during data transfers, and a lockless mechanism for speeding up queue operation and queuing and delivering messages simultaneously.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The asynchronous message passing methods and systems described may be provided as software programs that are generally stored in an executable form on a computer readable medium such as a random access memory (RAM), read only memory (ROM), optical disk (CD-ROM), or magnetic storage medium (hard drive or portable diskette), or may be implemented by hardware means, or other means known in the art. These functionalities may be provided, for example, as combination of functions of an asynchronous messaging library and extensions to existing synchronous kernel calls of a real time operating system (RTOS). The asynchronous messaging library may include functions for both sending and receiving messages. The functionalities described also may be provided over multiple libraries.

Figure 1:
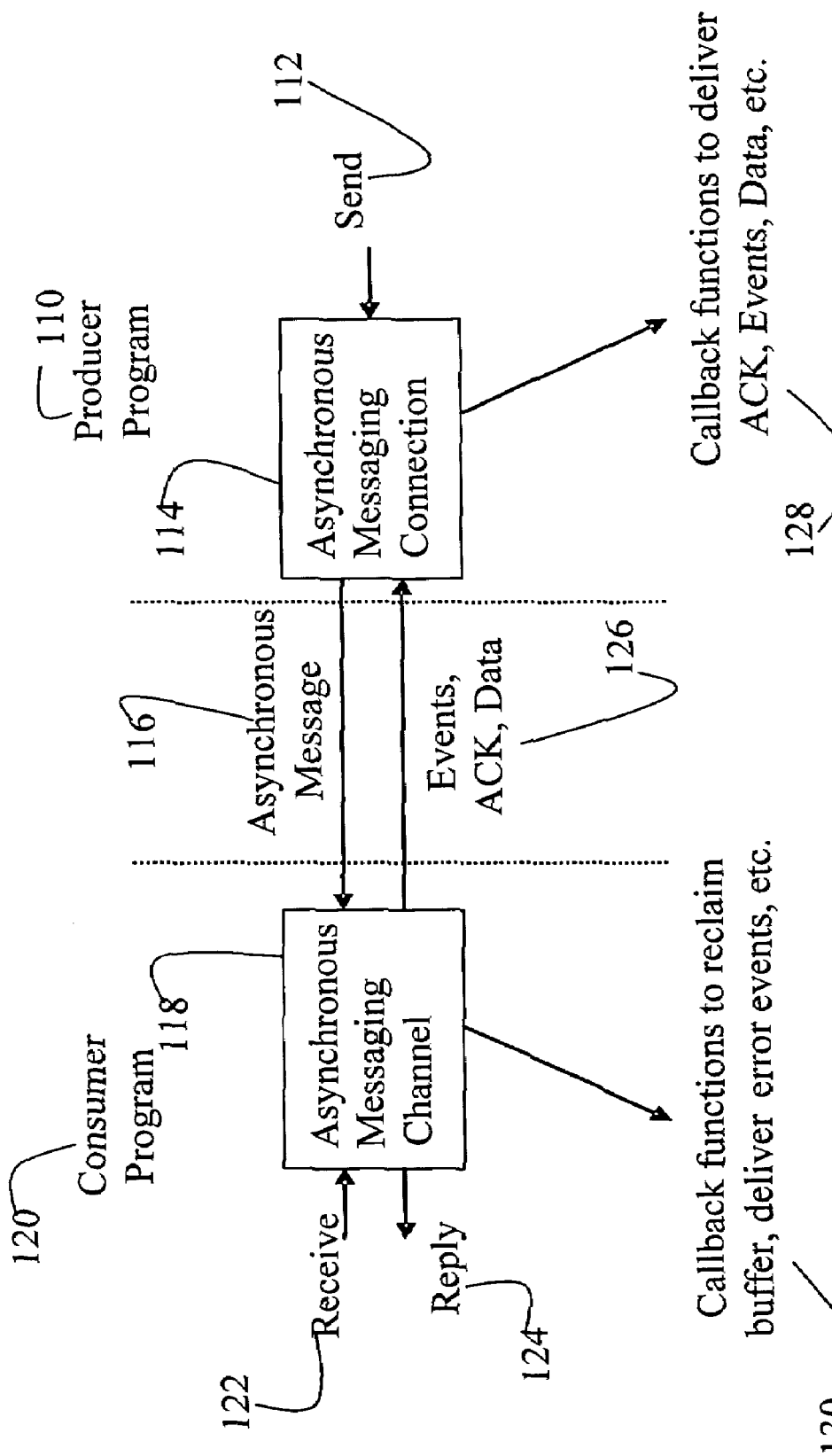
FIG. 1 shows an exemplary bidirectional communication model for delivering asynchronous messages between threads of an operating system.

An exemplary bidirectional communication model 100 for delivering asynchronous messages between programs of an operating system is shown in FIG. 1. The model 100 includes a producer thread 110 that sends data to a consumer program 120. The programs 110 and 120 may be threads, processes, and the like operating on the same node of a distributed operating system. Alternatively, the programs 110 and 120 may operate on different nodes of the system. To pass asynchronous messages between the programs 110 and 120, the producer program 110 may call a send function 112 to forward messages to an asynchronous messaging connection 114 associated with the producer program 110. The connection 114 may provide a mechanism for sending asynchronous messages 116 to an asynchronous messaging channel 118 associated with the consumer program 120. For example, each connection 114 may buffer messages from the producer thread 110 until a certain trigger event has occurred. Messages may be buffered until, for example, a certain number of messages are written to the buffer or a certain amount of time has elapsed since the last passing of messages. Messages may be passed by joining the connection 114 and channel 118 at the kernel level, and copying data directly from memory space associated with the producer program to that associated with the consumer program 120. Alternatively, or additionally, triggering and data passing may be performed using any known method. The consumer thread 120 associated with this channel 118 may call a receive function 122 to collect the message 116, and a reply function 124 to send a reply or acknowledgement message 126 to the producer program 110. Call back functions 128, which may automatically be called upon the occurrence of a particular event, may be provided to claim the reply or acknowledgement messages 126, handle buffer errors, and the like. Additionally, call back functions 130 may also be provided on the consumer program 120 side to handle errors, such as message delivery and send buffer errors.

The asynchronous messaging connection 114 and channel 118 may provide a level of abstraction that allows user programs to target particular ports 114 and 118, rather than specific threads, processes, and the like. The connection 114 and channel 118 may be bidirectional to both send and receive messages, or multiple one-way connections 114 and channels 118 may be used to send and receive messages among programs, threads, and the like. To receive asynchronous messages, programs such as the consumer program 120 may create an asynchronous messaging port. Asynchronous messaging ports designed to receive messages may be referred to as a channel 118. After a channel 118 is established, any program may attach to this channel to begin sending messages. Multiple threads, processes and the like may all connect to the same channel 118.

Each channel 118 may have a variety of attributes, such as a channel ID used to identify the channel 118. Additionally, each channel 118 may also include a queue for received messages. An additional queue for a free buffer list may also be included. Channels 118 may be defined by channel objects that store these channel attributes and buffer management data. For example, an asynchronous messaging channel object may include attributes that define a linked list of channels, a channel ID, flags for the channel, access permissions, buffer size, maximum number of buffers allowed, an event to be set for notification, a queue for received messages, a queue for a free buffer list, and a mutex, or mutual exclusion lock, used to protect the integrity of the received message queue. These channel objects may be stored in a hash table.

Another asynchronous messaging port, referred to as a connection 114, may be created by the producer program 110 for passing asynchronous messages 116 to a consumer program 120. In order to pass asynchronous messages to a consumer program 120, a connection 114 may be created and attached to a channel 118. Like a channel 118, the connection 114 may be defined by a connection object used to store connection attributes and buffer data management. If multiple threads of a process all attach to the same channel 118, a single connection 114 may be shared between the threads. Alternatively, or additionally, multiple connections may be created that attached to the same channel 118. For example, each connection 114 may include attributes that define callback functions, a message buffer size, a maximum number buffers allowed for a connection, and triggering information. Triggering information may include a number of messages at which point messages may be passed to the channel 118, an amount of time between message passing events, flags for enabling and/or disabling triggering methods, and the like. Exemplary callback functions include error notification callback functions, and callback functions that may allow for the reclamation of buffer space upon message delivery. This information may be stored in a connection attribute object.

Figure 2:
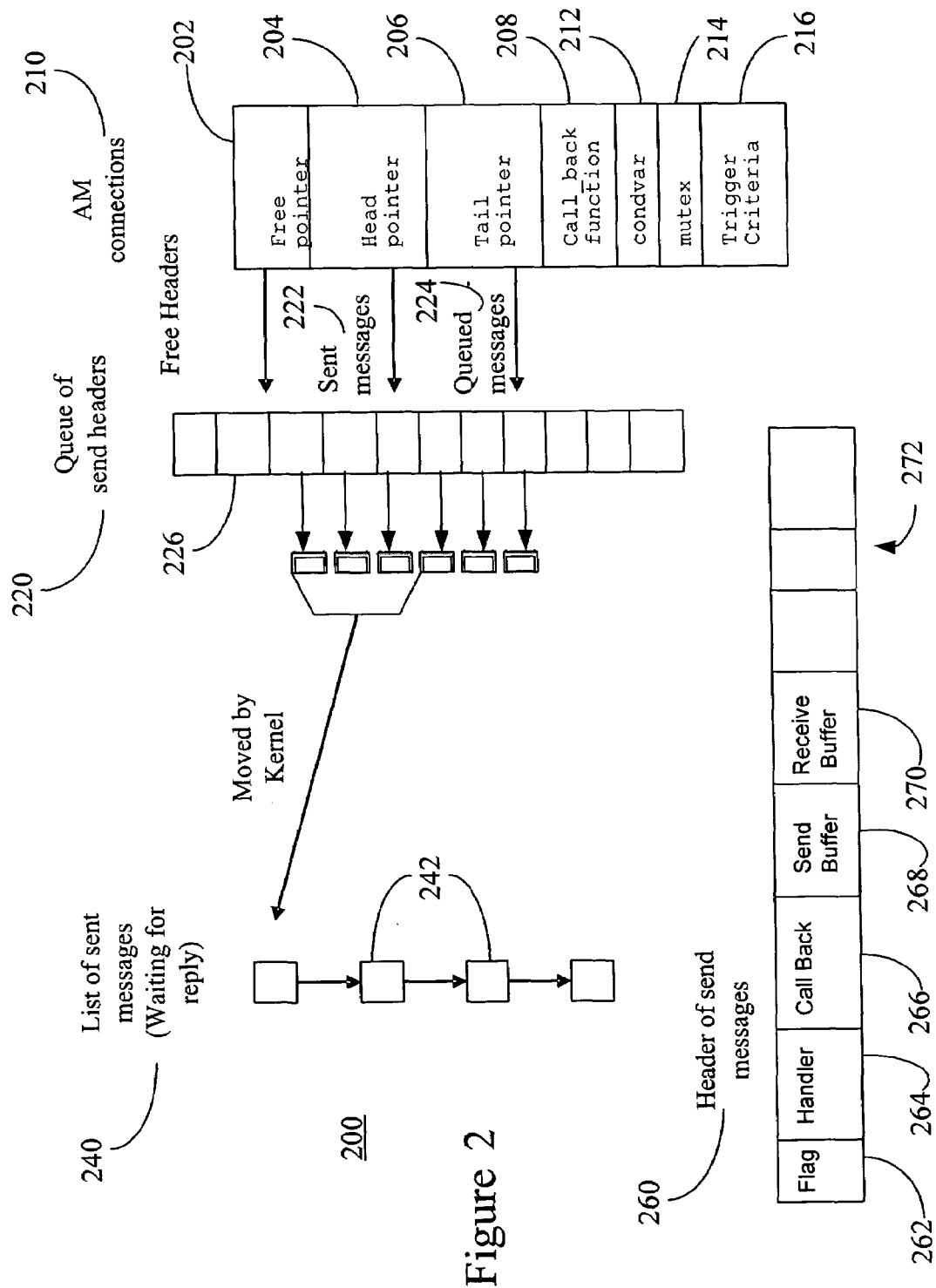
FIG. 2 shows exemplary connection object data structures for passing messages asynchronously.

Each connection 114 may be shared among the kernel module and an asynchronous messaging library. The connection 114 may include a queue, linked list or the like of messages to be sent to the channel 118. Connections 114 may be defined by connection objects, which may map to a file descriptor to allow programs, such as the producer thread 110, to send messages directly to the connection via the file descriptor, which may be a connection identifier. Alternatively, other mechanisms may be used to pass messages from programs to connections 114. Referring also to FIG. 2, the connection object may include such elements as an array of asynchronous message headers for messages to be sent to the channel 118, flags for the asynchronous connection, pointers to the start, head 204, and tail 206 of the message queue 220, the size of the list of headers, a pointer 202 to the start of free space in the message queue, error status of the connection, events, a number of pending messages, a timer that maybe used, for example, to trigger message passing 216, a connection attributes object, described above, and the like. The connection may be shared among the kernel and the asynchronous messaging library, for example, by allowing only the kernel to adjust the head pointer while allowing only the asynchronous messaging library to edit the tail and free pointers. This sharing mechanism may provide lockless access to the send message queue so that new messages may be queued while previously queued messages are passed to the channel 118. The asynchronous message may include such information as the error status of the message, a pointer to the input/output vector (iov) array that contains the body of the message, the size of the iov array, and a handler used to identify the asynchronous messages. Handlers may be used in both the producer 110 and consumer 120, and a map function may be used to establish a one-to-one relationship between the handlers used each sides. Alternatively, or additionally, the connection object may also include a condition variable and mutex, or mutual exclusion lock, which together can be used to protect integrity of the message queue by blocking other threads from executing when the queue is full in a known manner.

Exemplary connection object data structures are shown in FIG. 2. As illustrated, a connection object may include attributes 210, a queue of message headers 220, and a list of sent messages 240 that may be waiting for a reply. The attributes 210 may include a pointer to the start 202 of free headers 226 in the message queue 220 and pointers to the start 204 and end 206 of the messages list in the queue 220, which together may define the sent 222 and queued messages 224. The connection object may also include call back functions 208, a condition variable 212, mutex 214, and trigger criteria 216. After messages are passed to the channel, the sent messages 242 may be added to a linked list 240 of sent message headers. Each message may include a header 260 that may include one or more flags 262, a handle 264, a call back function 266, a send buffer 268, a receive buffer 270, and any additional information 272 as needed or desired.

As described above, channel 118 and connection 114 may be joined by at the kernel level. To manage this union, a union object may be created. The union object may include such information as flags for the channel, access permission, the size of the kernel buffer, the maximum number of buffers allowed, an event to be set for notification and an associated handler for the event, the number of messages in the channel send queue, credential information, and the like.

Figure 3:
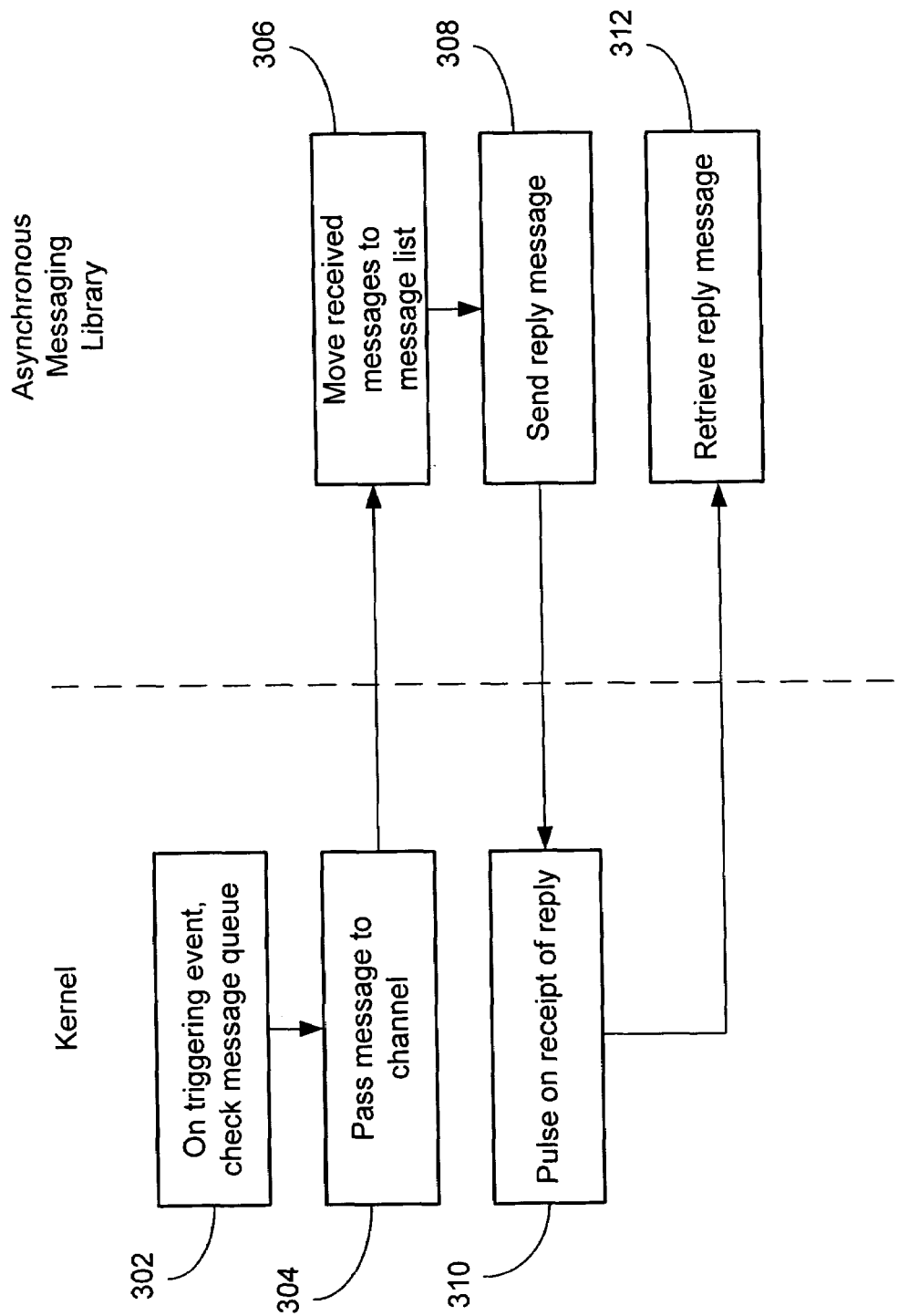
FIG. 3 shows an exemplary flow chart depicting the operations of a kernel module and an asynchronous messaging library.

Referring also to FIG. 3, an exemplary flow chart showing the operations of a kernel module 340 and an asynchronous messaging library 320 are shown. In operation the kernel 340 may check the message queue 220 upon the triggering event at step 302. As it passes messages to a channel 114 at step 304, the kernel 340 may move the head pointer 204, which points to the start message queue, to the appropriate message in the message queue 220. The asynchronous messaging library 320 may then move the sent messages 242 to the list of sent messages 240 at step 306. A handle 264, such as the address of the message header, may be used to generate a receive identifier for the consumer program 120. After the received message has been processed, a reply function may be called to send back a reply or acknowledgement message at step 308. This reply message may include, for example, the receiver identifier. The kernel 340 may then notify the asynchronous messaging library 320 that messages have been delivered by sending a pulse, which may be a fixed-size non-blocking message, setting a flag 262 in the message header 260, and the like at step 310. The asynchronous messaging library 320 may then deliver the reply or acknowledgement to the producer program 110, such as via a callback function and the like, at step 312. The reply messages may be buffered in the producer program's 110 asynchronous messaging library until a certain criteria is met, at which point a kernel call may be made to deliver multiple messages to the producer program 110.

Figure 4:
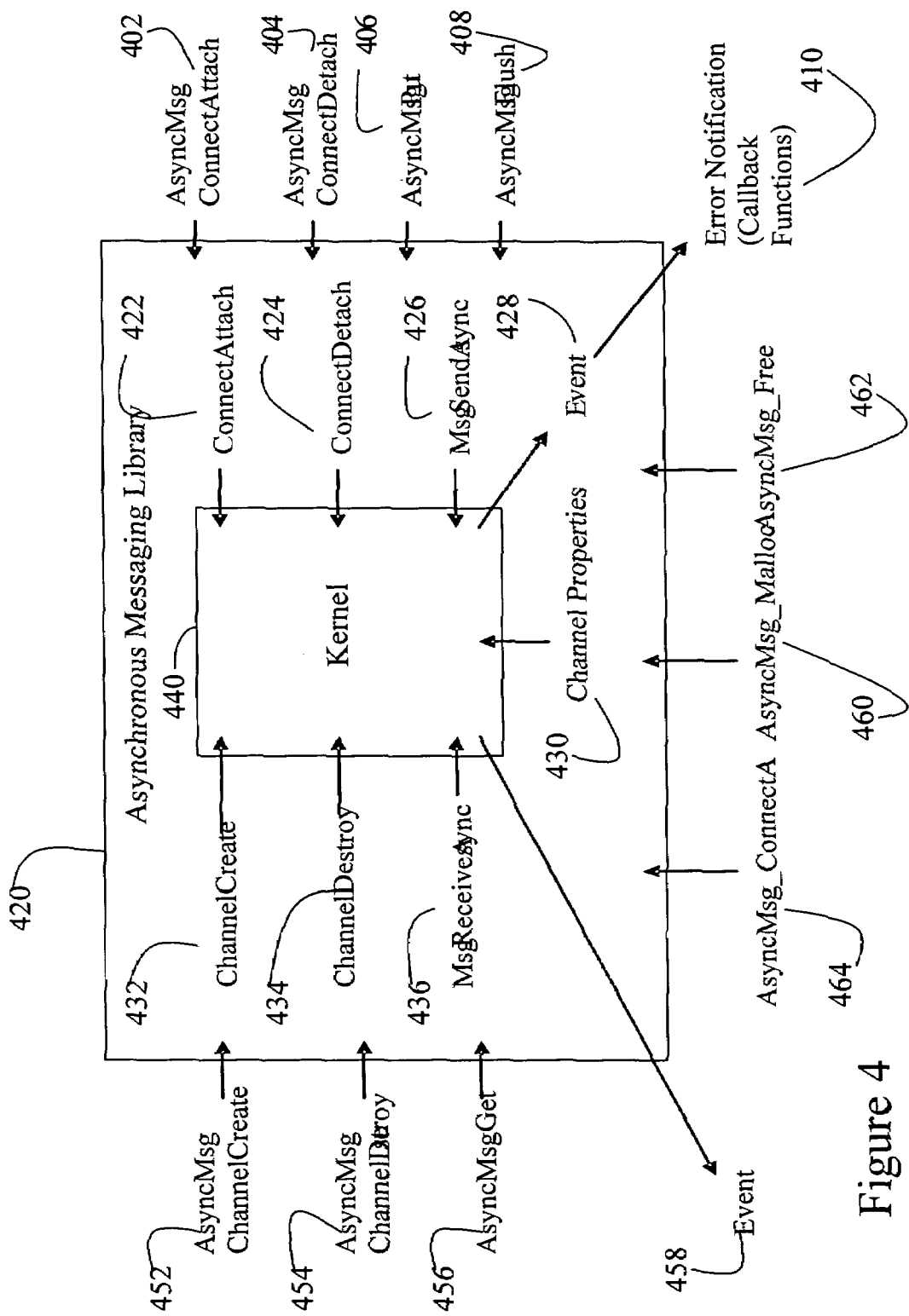
FIG. 4 is a diagram depicting the relationship between exemplary functions of an asynchronous messaging library and associated kernel calls of a kernel module for passing messages asynchronously.

A diagram 400 showing the relationship between exemplary functions 402, 404, 406, 408, 410, 452, 454, 456, 458, 460 and 462 of an asynchronous messaging library 420 and associated kernel calls 422, 424, 426, 432, 434, and 436 of a kernel module 440 is shown in FIG. 4. The asynchronous messaging library 420 may include functions such as an AsyncMsg_ConnectAttach function 402, an AsyncMsg_ConnectDetach function 404, AsyncMsg_Put function 406, an AsyncMsg_Flush function 408, call back functions 410, an AsyncMsg_ChannelCreate function 452, an AsyncMsg_ChannelDestroy function 454, an AsyncMsg_Get function 456, events 458, an AsyncMsg_Malloc function 460, and an AsyncMsg_Free function 462. The kernel 440 may include calls such as ConnecAttach 422, ConnectDetach 424, MsgSendAsync 426, Event 428, ChannelProperties 430, ChannelCreate 432, ChannelDestroy 434, and MsgReceiveAsync 436.

Figure 6:
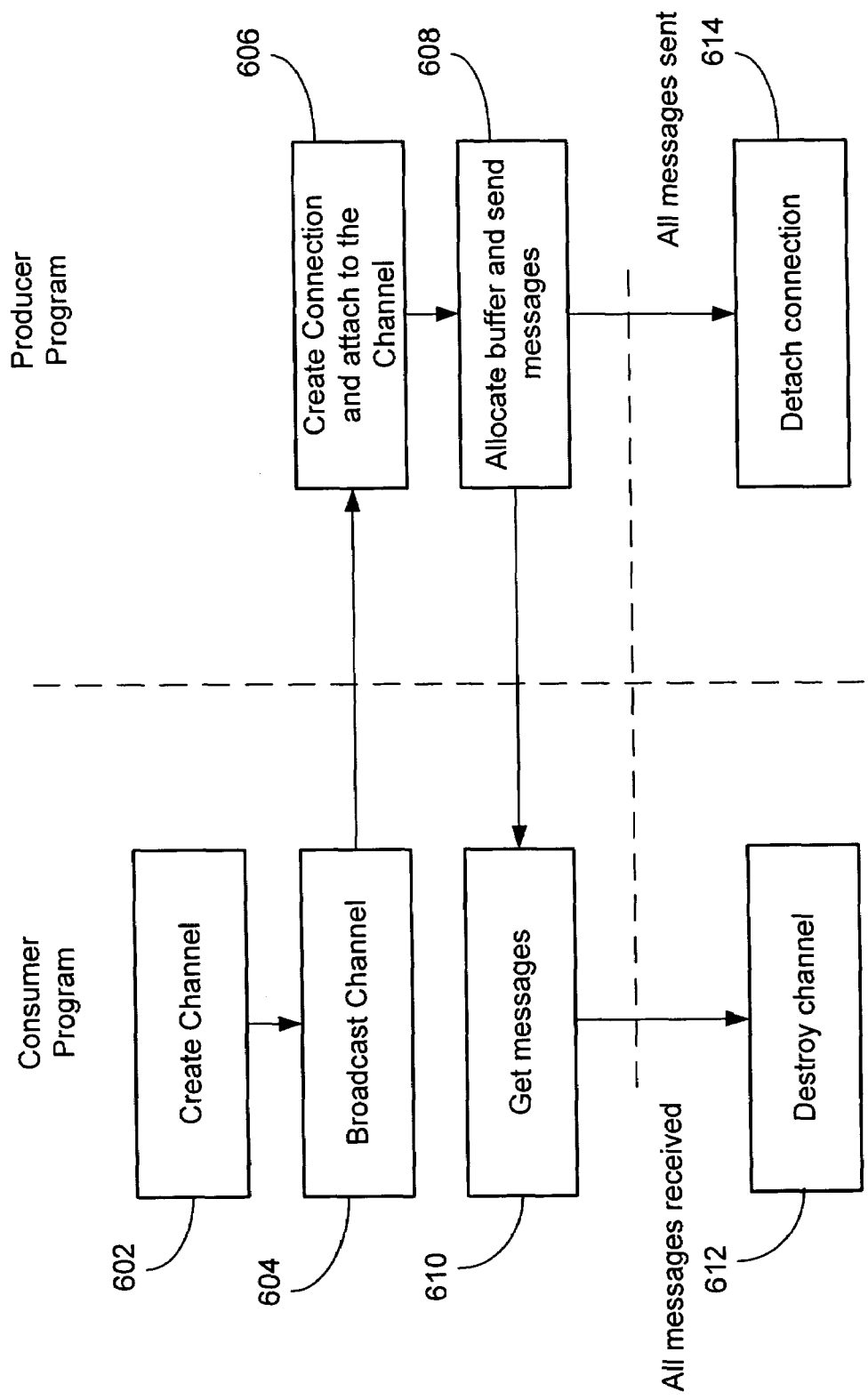
FIG. 6 is an exemplary flow chart depicting exemplary asynchronous message passing operations of a consumer program and producer program.

Referring also to FIG. 6, an exemplary flowchart depicting asynchronous message passing operations of a consumer program and producer program. The AsyncMsg_ChannelCreate function 452 may be called initially by a consumer program 120 to create an asynchronous messaging channel 118 at step 602. The function 452 may return a channel identifier, such as an integer, used to identify the channel. This channel identifier is then broadcast to the producer 110 at step 604, which may call the AsyncMsg_ConnectAttach function 402 to establish a connection 114 at step 606. The producer program 110 may allocate a buffer by calling the AsyncMsg_Malloc function 460, and calling the AsyncMsg_Put function 406 to send a message at step 608. Alternatively, or additionally, the producer program 110 may use its own buffers and using a call back function established with the connection to reclaim its buffers. Errors in the sending process may be handled using associated call back functions 410.

After a message has been passed to the channel 118 at step 608, the consumer program 120 may call the AsyncMsg_Get function 456 to retrieve the message at step 610. This function may be blocking or non-blocking, and may use the library's 420 internal buffer to receive a buffer, which may then be freed using the AsyncMsg_Free function 462. The internal buffer space may be configured to automatically align the buffers for page swapping and copy-on-write optimization for large messages, which are typical candidates for asynchronous transfer. When the message passing is complete, a channel 118 may be destroyed at step 612 via the AsyncMsg_ChannelDestroy function 454, which in turn calls the ChannelDestroy 434 kernel call to destroy the channel 118.

The consumer program 120 may establish various channel attributes when creating a channel 118. For example, the consumer program 120 may set the channel 118 as blocking or non-blocking, as well as the data transfer type. The channel 118 may transfer data in packets, or a stream of data may be used. Channel permissions, a buffer size, maximum number of buffers, notification event, and buffer allocation callback function may also be established. Channel permissions may be used to control who can make a connection to the channel 118. The buffer allocation callback may allocate receive buffers if the consumer program 120 wants to use its own buffers and free buffers when the channel 118 is destroyed.

The number of buffers to be actually allocated buffers may be passed to the consumer program 120. When freeing buffer space, an error code may be returned to the consumer program 120. Additionally, or alternatively, any of the channel attributes may be set by the consumer 120 via the AsyncMsg_ChannelCreate function 452. The AsyncMsg_ChannelCreate function 452 may pass these parameters in turn to a ChannelCreate kernel call 432. The kernel call may create a channel having the attributes established above.

As described above, the producer program 110 may connect to the channel 118 at step 606 using the AsyncMsg_ConnectAttach function 402, which may connect a process identified by a process identifier with a channel associated with its own identifier and return a connection identifier, such as an integer, to the producer program 402 by calling the ConenctAttach kernel call 424. Flags may also be set to create a connection 114 to the 30 channel 118 using library buffers or program buffers, and to designate the connection 114 as blocking. If library buffers are to be used, the AsyncMsg_Malloc function 460 may be called to allocate the buffers. The buffers may be freed via the AsyncMsg_Free function 462. Error handling call back functions may also be established set for the connection 114. The producer may detach from the channel 118 at step 614 by calling the AsyncMsg_ConnectDetach function 404, which in turn calls the ConnectDetach 424 kernel call to destroy the connection, when message passing to the consumer 120 is finished. The queued messages in the connection may be discarded or, alternatively, sent to the consumer 120 before destroying the connection.

Once the connection 118 has been created, the AsyncMsg_Put function 406 may be called to add messages to the queue 220 at step 608. When putting a message on the queue 220, the user may override the default handler associated with a particular message, so that customized functionality may be implemented on a per message basis. When the trigger criteria has been met, or whenever the user calls the AsyncMsg_Flush function 408, messages may be passed to the channel 118 by the MsgSendAsync 426 kernel call, which may notify the kernel that some asynchronous messages have been queued for delivery. The queued messages may be delivered upon the receipt of the MsgReceiveAsync 436 kernel call, which may be called by the AsyncMsg_Get function 456. Alternatively, the messages may be transferred before the MsgReceiveAsync 436 kernel call is made. The MsgReceiveAsync 436 kernel call may be blocking or non-blocking. Additionally, an AsyncMsg_ConnectAttr function 464 may be provided to allow a user to set or retrieve connection and/or channel properties for connections or channels specified by a connection or channel identifier. The properties may be set or retrieved via a ChannelProperties kernel call 230.

Figure 5:
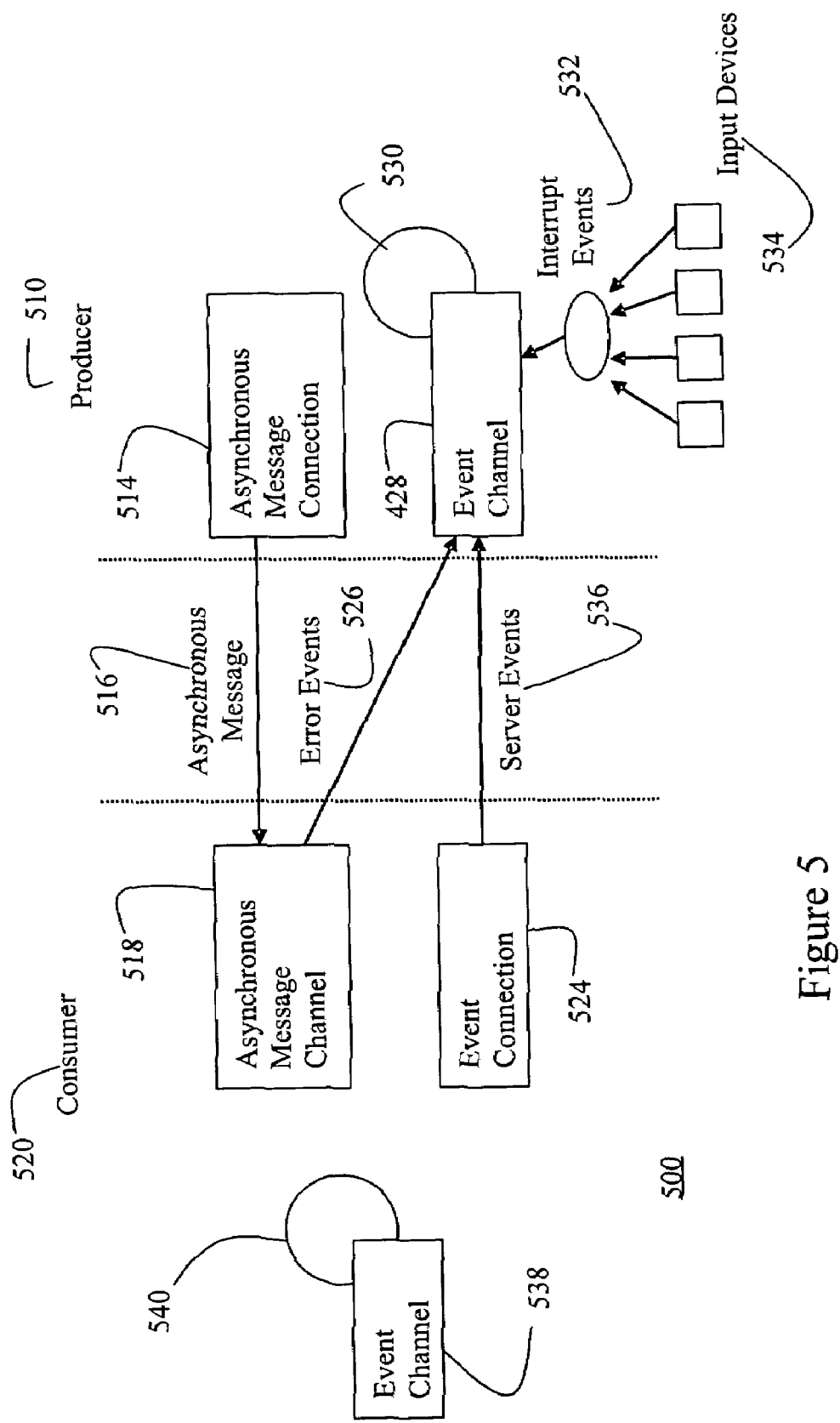
FIG. 5 is an exemplary communication model to use asynchronous messages to deliver large batch data, and to use synchronous message to deliver control and status events.

Optionally, a synchronous communication path may be provided in conjunction with an asynchronous channel 118 and connection 114 pair to provide for synchronous communications between the threads in parallel to the asynchronous message passing. The synchronous communication path may be provided using any known manner. For example, an exemplary model 500 for using asynchronous messages to deliver large batch data, and to use synchronous message to deliver control and status events is shown in FIG. 5. The synchronous communications may include events and synchronous messages that require in-order processing. A producer process 510 may collect data from some input devices, such as sensors, hard disks, and the like, buffers the data 516, and send it to another consumer process 520 for processing. In order to obtain a high throughput, the system 500 may use the asynchronous messaging to deliver the data 516 from producer program 510 to consumer because of its 'batch delivery' feature that greatly reduces the overhead. In the consumer process 520, an asynchronous messaging channel 518 may be created to receive the data 516. A separate synchronous channel (event channel 538) may be created to receive synchronous messages and pulses. A worker thread 540 may be blocked on the synchronous channel 538 to wait for service requests and events.

In the producer program 510, an asynchronous connection 514 is established to the consumer program's 520 asynchronous message channel 518 to send data 516. A synchronous channel 528 may also be created to receive error events 526, interrupt events 532, which may be generated by input devices 534, and synchronous messages 536. A worker thread 530 may be blocked on the channel 528 to receive the error events 526 and interrupt events 532 and messages. The consumer process 520 may also create a connection 524 to this channel 528 to deliver various events 536, such as commands, acknowledgements, status events (e.g., server is idle), and the like.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of asynchronously passing messages in an operating system, the method comprising:
   generating, by a consumer process in communication with the operating system, a channel for receiving asynchronous messages;
   generating, by a producer process, a connection for sending asynchronous messages;
   sending messages, by the producer process, to the connection;
   joining the channel and the connection;
   determining the occurrence of a triggering condition; and
   passing messages from the connection to the channel after determining the occurrence of the triggering condition.

2. The method of claim 1, where the operating system includes a kernel module, the method further comprising joining the channel and the connection within the kernel module.

3. The method of claim 2, where messages are passed, by the kernel module, directly from a sender memory space associated with the producer process to a receiver memory space associated with the consumer process.

4. The method of claim 2, where sending messages to the connection comprises adding the messages to a send messages queue.

5. The method of claim 4, where the send messages queue is shared between the kernel module and the producer process.

6. The method of claim 5, where the queue is shared in a lockless manner such that the producer process may send messages to the connection while the kernel module is passing messages to the channel.

7. The method of claim 6, where the lockless method comprises:
   allowing only the kernel module to modify a head pointer to the beginning of a list of messages to be sent from the send messages queue; and
   allowing only the producer program to modify a tail pointer to the end of the list of messages to be sent from of the send messages queue and a free pointer to the start of free buffer space associated with the send messages queue.

8. The method of claim 1, further comprising:
   establishing a synchronous communication path between the producer process and the consumer process.

9. The method of claim 1, where the triggering condition is a predetermined number of messages in send messages queue.

10. The method of claim 1, where the triggering condition is an expiration of a time period.

11. An operating system operable to asynchronously pass messages from a producer program to a consumer program, the operating system comprising:
   an asynchronous messaging library in communication with the producer program and the consumer program and operable to provide a channel to the consumer program and a connection to the producer program, the connection operable to receive messages from the producer program and add them to a messages queue, the channel operable to queue messages for the consumer program; and
   a kernel module in communication with the asynchronous messaging library and operable to pass messages from the producer program to the consumer program.

12. The operating system of claim 11, where messages are queued in the connection until a triggering event occurs.

13. The operating system of claim 12, where the triggering event is a predetermined number of messages in send messages queue.

14. The operating system of claim 12, where the triggering condition is an expiration of a time period.

15. The operating system of claim 11, where the messages are passed directly from a sender memory space associated with the producer process to a receiver memory space associated with the consumer process by the kernel module.

16. The operating system of claim 11, the messages queue is shared in a lockless manner such that the producer process may send messages to the connection while the kernel module is passing messages to the channel.

17. An asynchronous message passing architecture in communication with an operating system including a kernel module, the asynchronous message passing architecture operable to asynchronously pass messages from a sender to a receiver, the operating system comprising:
   an asynchronous messaging library in communication with the sender and the receiver and operable to provide a channel to the receiver and a connection to the sender, the connection operable to receive messages from the sender and add them to a messages queue, the channel operable to queue messages for the receiver; and
   where the kernel module is in communication with the asynchronous messaging library and operable to pass messages directly from the memory space associated with the sender to memory space associated with the receiver upon the occurrence of a triggering event.

18. The asynchronous message passing architecture of claim 17, the messages queue is shared in a lockless manner such that the sender may send messages to the connection while the kernel module is passing messages to the receiver.

19. The asynchronous message passing architecture of claim 18, where the lockless manner comprises:
   allowing only the kernel module to modify a head pointer to the beginning of a list of messages to be sent from the messages queue.

20. The asynchronous message passing architecture of claim 19, where the lockless manner further comprises:
   allowing only the asynchronous messaging library to modify a tail pointer to the end of the list of messages to be sent from of the messages queue and a free pointer to the start of free buffer space associated with the messages queue.

* * * * *